United States Patent
O'Lenick, Jr. et al.

(10) Patent No.: US 7,119,125 B1
(45) Date of Patent: Oct. 10, 2006

(54) BI-MODAL GUERBET ALKOXY SULFATE SURFACTANTS

(76) Inventors: Anthony J. O'Lenick, Jr., 2170 Luke Edwards Rd., Dacula, GA (US) 30019; Michael Heath, 6817 Staffordshire St., Houston, TX (US) 77030; Bobby Viteaux, 1212 Elmgrove La., Keller, TX (US) 76248

( * ) Notice: Subject to any disclaimer, the term of this patent is extended or adjusted under 35 U.S.C. 154(b) by 599 days.

(21) Appl. No.: 10/670,437

(22) Filed: Sep. 26, 2003

(51) Int. Cl.
*B01F 17/02* (2006.01)
*C07C 305/00* (2006.01)

(52) U.S. Cl. .......................................... 516/25; 558/34

(58) Field of Classification Search ..................... None
See application file for complete search history.

(56) References Cited

U.S. PATENT DOCUMENTS 6,610,751 B1    8/2003    O'Lenick

*Primary Examiner*—Paul A. Zucker

(57) ABSTRACT

The present invention relates to specific compositions made by the sulfation of alkoxylated crude guerbet alcohol mixtures that contain between 15% and 50% lower molecular weight alkoxylated alcohols. The lower molecular weight alcohols are the raw material alcohols used to make the guerbet. Sulfated compositions made from this specific bi-modal distribution have unique emulsification properties and experience minimal chromatographic separation when used in downhole applications.

19 Claims, No Drawings

BI-MODAL GUERBET ALKOXY SULFATE SURFACTANTS

FIELD OF INVENTION

The present invention relates to compositions made by sulfation of specific alkoxylated crude guerbet alcohol mixtures that contain between 15% and 50% lower molecular weight alkoxylated alcohols. The lower molecular weight alcohols are the raw material alcohols used to make the Guerbet alcohols. Compositions containing these specific bi-modal distributions of sulfated Guerbet alkoxylates make unique emulsions, specifically since they allow for the emulsification of a manifold increase in non-polar liquids over traditional emulsifiers.

BACKGROUND OF THE INVENTION

Guerbet alcohols have been known for over 100 years now. Marcel Guerbet pioneered the basic chemistry in the 1890s. It has allowed for the synthesis of a regiospecific beta branched hydrophobe which introduces high purity branching into the molecule. Guerbet Alcohols, the oldest and best-understood material in the class of compounds, have been known since the 1890's when Marcel Guerbet first synthesized these materials.

The reaction sequence, which bears his name, is related to the Aldol Reaction and occurs at high temperatures under catalytic conditions.

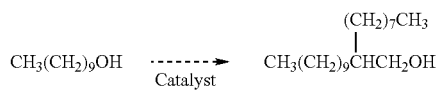

The product is an alcohol with twice the molecular weight of the reactant alcohol minus a mole of water. The reaction proceeds by a number of sequential steps. These steps are (a) oxidation of alcohol to aldehyde, (b) Aldol condensation after proton extraction, (c) dehydration of the Aldol product, and (d) hydrogenation of the allylic aldehyde. The reaction takes place without catalyst, but it is strongly catalyzed by addition of hydrogen transfer catalysts. At low temperatures 130–140° C. the rate-limiting step is the oxidation process (i.e. formation of the aldehyde). At somewhat higher temperatures 160–180° C. the rate-limiting step is the Aldol Condensation. At even higher temperatures other degradative reactions occur and can become dominant.

Many catalysts have been described in the literature as effective for the preparation of Guerbet Alcohols. These include, nickel, lead salts (U.S. Pat. No. 3,119,880), Oxides of copper, lead, zinc, chromium, molybdenum, tungsten, and manganese (U.S. Pat. No. 3,558,716). Later US patents (U.S. Pat. No. 3,979,466) include palladium compounds and silver compounds (U.S. Pat. No. 3,864,407). There are advantages and disadvantages for each type.

The Cannizzaro Reaction is a major side reaction and is described as the disproportionation of two molecules of an aldehyde brought about by the action of sodium or potassium hydroxide to yield the corresponding alcohol and acid. On a practical level, it results in a product that is both difficult to purify and has undesired impurities present. As a result, the ability to capitalize upon the Guerbet reaction and develop useful, cost-effective derivatives has eluded scientists for many years.

A major problem with the currently used Guerbet products is the fact that they are sold as very high purity products, requiring elaborate clean up processes and post treatments to make products that find applications mostly in cosmetic products. Guerbet alcohols undergo a series of post reaction steps that (a) remove unreacted alcohol (vacuum stripping), (b) remove unsaturation (hydrogenation), (c) remove Cannizzaro soap (filtration) and (d) remove color/odor bodies. These operations add to the cost of the product and make their utility impractical. All inventions covering Guerbet alcohols and their derivatives were made using highly purified materials which not only limited the usefulness due to costs, but also, as will become apparent by this disclosure, resulted in mono-modal surfactants that lack the highly efficient emulsification properties that result when using lower purity products. By lower purity products is meant those products in which unreacted raw material alcohol is left in the mixture and subsequently co-alkoxylated then sulfated to give bi-modal surfactants having unique emulsification properties.

Most commonly, alcohols of natural origin, which are straight chain, even-carbon, primary alcohols are used for the production of Guerbet alcohols. Guerbet alcohols are beta branched primary alcohols. Oxo alcohols can also be used, but the reaction rate and conversions are reduced. Blends of primary alcohols could, of course, be used as starting materials to achieve desired economics or end-use functionality.

U.S. Pat. No. 6,610,751 issued Aug. 26, 2003 to O'Lenick et al discloses the starting alkoxylates used to make the compounds of the present invention and are incorporated herein by reference.

We have surprisingly found that by sulfation of the low purity guerbet bi-modal alkoxylate, a very potent emulsifier results. Said surfactant is an outstanding emulsifier for hydrocarbons, chlorinated hydrocarbons and other non-polar liquids. These emulsifiers are outstanding when used with crude petroleum and other non-polar compounds, and consequently are useful in enhanced oil recovery and remediation of contaminated soil. Other end uses that require such potent emulsification properties include emulsification and wetting of agricultural active ingredients as well as emulsification of monomers in polymerization processes.

The Invention

Objective of the Current Invention

It is an objective of the present invention to provide unique bi-modal alkoxy sulfate surfactants. These bi-modal surfactants are made up of between 50 and 90% by weight of a sulfated guerbet alcohol alkoxylate and between 10% and 50% by weight of a sulfated non-guerbet starting alcohol alkoxylate.

It is another objective of the present invention to provide a process for making emulsions using the unique bi-modal alkoxy sulfate surfactants of the present invention.

SUMMARY OF THE INVENTION

The current invention is aimed at a bi-modal alkoxy sulfate surfactant made by the sulfation reaction of an alkoxylated bimodal guerbet alcohol. The concept of bimodal guerbet alcohols was disclosed by the present inventors in U.S. Pat. No. 6,610,751 issued Aug. 26, 2003, a patent to which this case is a co-pending application. We found that when the guerbet reaction is carried out to between 50% and 75% many important, heretofore unrecognized benefits occur. The first is that the Cannizzaro reaction is almost nil, secondly the formation of higher molecular weight species likewise is almost nil, thirdly the reaction time is significantly reduced, yields are increased and most importantly when the resulting composition is alkoxylated with ethylene oxide, propylene oxide and mixtures thereof, unique very efficient bi-modal emulsifiers result. The sulfation of the bimodal alkoxylated products result in even more unexpected results in that the efficiency of the emulsifiers is increased many times. By efficiency of emulsification is meant the ability of one gram of emulsifier to emulsify a given amount of oil. Typically, the oil-to-emulsifier ratio has been that for every one part of emulsifier, one can emulsify about 20 parts of oil. So, for example, 3 grams of traditional emulsifier may emulsify 60 grams of oil. The products of the present invention will generally emulsify 100 times their weight in oil, making very efficient packages for emulsification.

Among other applications, these materials are envisioned for so called "downhole" applications, which include not only enhanced oil recovery, but remediation of oil contaminated sites with a surfactant wash. Typically solutions of surfactants and water are pumped into a hole or well and flushed through the ground or rock. A collection pipe is usually sunk nearby and the water/surfactant/oil emulsion is removed. The selection of the proper emulsifier package is complicated. It must not only emulsify the oil, but the surfactant package components must not separate in the ground. The various components in the ground often preferentially adsorbed specific surfactant components and retard their flow due to differential attractions. This is referred to as "chromatographic separation" and the amount of oil emulsified is proportionally decreased. By using a bimodal alkoxy sulfate, the separation is lessened. Without wanting to be held to any specific theory, we believe that this is likely due to the fact that these bimodal products are highly branched as well as contain "related bimodal materials" which have a higher affinity for each other and consequently suffer less chromatographic separation than systems in which no related bimodal surfactants are used.

DETAILED DESCRIPTION OF THE INVENTION

The current invention relates to a bi-modal emulsifier composition, which comprises:
(a) between 10% and 50% by weight of an emulsifier which conforms to the following structure:

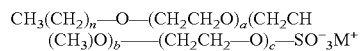

wherein;
n is an integer ranging from 5 to 19;
a, b, and c are independently each integers ranging from 0 to 20;
M is a group needed as a counter ion and selected from the group consisting of Na, K, Ca, Mg, $NH_4$ and HN—$(CH_2CH_2OH)_3$ and
(b) between 90% and 50% of an emulsifier which conforms to the following structure:

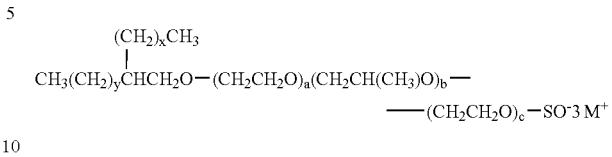

wherein;
y is an integer ranging from 5 to 19, and is equal to n;
x is an integer ranging from 3 to 17 with the proviso that x=y+2
a, b, and c are independently each integers ranging from 0 to 20
M is a group needed as a counter ion and selected from the group consisting of Na, K, Ca, Mg, $NH_4$ and HN—$(CH_2CH_2OH)_3$ Another aspect of the invention is drawn to a process for making an emulsion, which comprises mixing;
(1) between 1% and 90% by weight of a water insoluble oil,
(2) between 98% and 10% water
and
(3) between 1% and 15% by weight of bi-modal sulfated emulsifier compositions, which comprises:
(a) between 10% and 50% by weight of an emulsifier which conforms to the following structure:

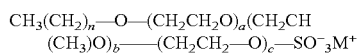

wherein;
n is an integer ranging from 5 to 19;
a, b, and c are independently each integers ranging from 0 to 20;
M is a group needed as a counter ion and selected from the group consisting of Na, K, Ca, Mg, $NH_4$ and HN—$(CH_2CH_2OH)_3$
and
(b) between 90% and 50% of an emulsifier which conforms to the following structure:

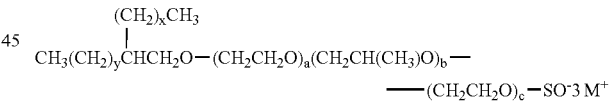

wherein;
y is an integer ranging from 5 to 19, and is equal to n;
x is an integer ranging from 3 to 17 with the proviso that x=y+2
a, b, and c are independently each integers ranging from 0 to 20
M is a group needed as a counter ion and selected from the group consisting of Na, K, Ca, Mg, $NH_4$ and HN—$(CH_2CH_2OH)_3$ The various proviso listed above are a direct result of the fact that the alcohol undergoing the Aldol condensation is the exact same alcohol that makes up the non-guerbet portion of the composition. Clearly, the non-guerbet alcohol has a much lower molecular weight than the guerbet alcohol (half the molecular weight+18). When this bi-modal mixture is alkoxylated as a mixture, the result is an emulsifier pair with outstanding emulsification properties due in part to the bi-modal composition.

PREFERRED EMBODIMENTS

In a preferred embodiment n is 5, x is 3 and y is 5.
In a preferred embodiment n is 9, x is 7 and y is 9.
In a preferred embodiment n is 7, x is 5 and y is 7.
In a preferred embodiment n is 11, x is 9 and y is 11.
In a preferred embodiment n is 19, x is 17 and y is 19.
In a preferred embodiment a+c ranges from 0–40.
In a preferred embodiment b ranges from 0 to 20.
In a preferred embodiment a+c ranges from 0–40 and b ranges from 0 to 20.
In a preferred embodiment M is Na.
In a preferred embodiment M is K.
In a preferred embodiment M is Ca.
In a preferred embodiment M is Mg.
In a preferred embodiment M is $NH_4$.
In a preferred embodiment M is $HN-(CH_2CH_2OH)_3$
In a preferred embodiment a, b and c are all 0, resulting in an oil soluble emulsifier.

EXAMPLES OF BI-MODAL GUERBET ALCOHOLS

Example #1–5

To 967 grams of decyl alcohol in a suitable reaction flask, add 30.0 grams of sodium hydroxide and 2.0 grams of nickel, under good agitation. Heat material to between 230 and 250° C. The water generated from the reaction will be removed. Reaction progress is followed by GLC analysis. Samples were taken at different points in the reaction as shown below:

| Example | $CH_3(CH_2)_9\underset{\underset{(CH_2)_7CH_3}{|}}{C}HCH_2OH$ | $CH_3(CH_2)_9OH$ |
|---|---|---|
| 1 | 50.0% | 50.0% |
| 2 | 60.2% | 39.8% |
| 3 | 74.6% | 24.4% |
| 4 | 85.0% | 15.0% |
| 5 | 90.0% | 10.0% |

Example #6–10

To 1000 grams of octyl alcohol in a suitable reaction flask, add 30.0 grams of potassium carbonate and 1.0 grams of nickel, under good agitation. Heat material to 220 to 240° C. The water generated from the reaction is distilled off. Reaction progress is followed by GLC analysis. Samples were taken at different points in the reaction as shown below:

| Example | $CH_3(CH_2)_7\underset{\underset{(CH_2)_9CH_3}{|}}{C}HCH_2OH$ | $CH_3(CH_2)_7OH$ |
|---|---|---|
| 6 | 50.0% | 50.0% |
| 7 | 60.0% | 40.0% |
| 8 | 75.0% | 25.0% |
| 9 | 85.0% | 15.0% |
| 10 | 90.0% | 10.0% |

Example #11–15

To 1000 grams of lauryl alcohol in a suitable reaction flask, add 30.0 grams of potassium carbonate and 1.0 grams of nickel, under good agitation. Heat material to 220 to 240° C. The water generated from the reaction will be distilled off. Reaction progress is followed by GLC analysis. Samples were taken at different points in the reaction as shown below:

| Example | $CH_3(CH_2)_{11}\underset{\underset{(CH_2)_9CH_3}{|}}{C}HCH_2OH$ | $CH_3(CH_2)_{11}OH$ |
|---|---|---|
| 11 | 50.0% | 50.0% |
| 12 | 60.0% | 40.0% |
| 13 | 75.0% | 25.0% |
| 14 | 85.0% | 15.0% |
| 15 | 90.0% | 10.0% |

Example #16–20

To 1000 grams of C-20 alcohol in a suitable reaction flask, add 30.0 grams of potassium carbonate and 1.0 grams of nickel, under good agitation. Heat material to 220 to 240° C. The water generated from the reaction is distilled off. Reaction progress is followed by GLC analysis. Samples were taken at different points in the reaction as shown below:

| Example | $CH_3(CH_2)_{19}\underset{\underset{(CH_2)_{17}CH_3}{|}}{C}HCH_2OH$ | $CH_3(CH_2)_{19}OH$ |
|---|---|---|
| 16 | 50.0% | 50.0% |
| 17 | 60.0% | 40.0% |
| 18 | 75.0% | 25.0% |
| 19 | 85.0% | 15.0% |
| 20 | 90.0% | 10.0% |

Example #21–25

To 1000 grams of hexyl alcohol in a suitable reaction flask, add 30.0 grams of potassium carbonate and 1.0 grams of nickel, under good agitation. Heat material to 220 to 240° C. The water generated from the reaction will be distilled off. Reaction progress is followed by GLC analysis. The product is a mixture of 2-butyl-octanol and hexyl alcohol. Samples were taken at different points in the reaction as shown below:

| Example | $CH_3(CH_2)_5\underset{\underset{(CH_2)_3CH_3}{|}}{C}HCH_2OH$ | $CH_3(CH_2)_5OH$ |
|---|---|---|
| 21 | 50.0% | 50.0% |
| 22 | 60.0% | 40.0% |
| 23 | 75.0% | 25.0% |
| 24 | 85.0% | 15.0% |
| 25 | 90.0% | 10.0% |

Examples of Bi-Modal Guerbet Alkoxylates

To the specified amount of the specified bi-modal guerbet is added 0.2% KOH based upon the total number of grams added (including ethylene oxide, propylene oxide and bimodal guerbet). The charge is "dried" (alcohol alkoxide is formed) by heating under nitrogen sparge through the dump valve. Begin heating the charge and allow to mix 15–20 minutes. Apply full vacuum and strip for 30–40 minutes at 220–240° F. Break vacuum with ethylene oxide and react at 290–300° F. and 45 psig. After all of the first ethylene oxide has been added, add propylene oxide. After the propylene oxide has been added, add the last portion of ethylene oxide. Hold at 290–300° F. for 1 hour.

| Example | Bimodal Alcohol Example | Ethylene Oxide (1) Grams | Propylene Oxide Grams | Ethylene Oxide (2) Grams |
|---|---|---|---|---|
| 26 | 1 | 341 | 0 | 0 |
| 27 | 2 | 355 | 645 | 0 | 0 |
| 28 | 3 | 372 | 628 | 0 | 0 |
| 29 | 4 | 387 | 613 | 0 | 0 |
| 30 | 5 | 392 | 608 | 0 | 0 |
| 31 | 6 | 564 | 436 | 0 | 0 |
| 32 | 7 | 580 | 420 | 0 | 0 |
| 33 | 8 | 597 | 403 | 0 | 0 |
| 34 | 9 | 612 | 388 | 0 | 0 |
| 35 | 10 | 618 | 382 | 0 | 0 |
| 36 | 11 | 297 | 703 | 0 | 0 |
| 37 | 12 | 310 | 690 | 0 | 0 |
| 38 | 13 | 328 | 672 | 0 | 0 |
| 39 | 14 | 340 | 660 | 0 | 0 |
| 40 | 15 | 344 | 656 | 0 | 0 |
| 41 | 16 | 438 | 440 | 590 | 440 |
| 42 | 17 | 466 | 44 | 59 | 440 |
| 43 | 18 | 542 | 440 | 590 | 0 |
| 44 | 19 | 536 | 600 | 400 | 600 |
| 45 | 20 | 550 | 0 | 590 | 0 |
| 46 | 21 | 144 | 0 | 400 | 0 |
| 47 | 22 | 152 | 0 | 400 | 200 |
| 48 | 23 | 165 | 0 | 59 | 440 |
| 49 | 24 | 169 | 880 | 1180 | 880 |
| 50 | 25 | 176 | 880 | 0 | 880 |

Sulfation Reaction

The sulfation of an alkoxylate may be carried out using a variety of sulfation reagents, most commonly SO$_3$ (sulfur trioxide) and HSO$_3$Cl (chlorosulfonic acid). Occasionally, less aggressive sulfation reagents like sulfamic acid may be employed. Regardless of the reagent used, the objective of the reaction is to turn the terminal OH group into an O—SO3H group. This acid ester is referred to as the "sauer ester" and is quickly neutralized to prevent its degradation.

Chlorosulfonic Acid Sulfation

R—OH+HSO$_3$Cl ⟶ RO—SO$_3$H (liquid) and HCl(gas)

The reaction is very exothermic and the HCl gas is removed under vacuum.

Neutralization of Sauer Ester

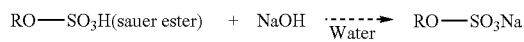
RO—SO$_3$H(sauer ester) + NaOH $\xrightarrow{\text{Water}}$ RO—SO$_3$Na Sulfur Trioxide Sulfation

R—OH+SO$_3$ ⟶ RO—SO$_3$H

The reaction is very exothermic and produces no HCl.

Neutralization of Sauer Ester

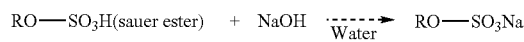
RO—SO$_3$H(sauer ester) + NaOH $\xrightarrow{\text{Water}}$ RO—SO$_3$Na General Procedure for Sulfation The entire amount of the product listed in the specified bimodal alkoxylate (Example 26–50) is added to a vessel equipped with a dropping flask, cooling, thermometer, mixing apparatus, nitrogen sparge and vacuum line. The addition of 107.0 grams of chlorosulfonic acid is begun slowly. Cooling is used to keep the temperature between 30 and 50° C. During the addition vacuum is applied and the HCl is removed.

After the addition is complete, the vacuum is removed and the product is added to an aqueous solution of base made by dissolving the listed number of grams of the specified base into water.

The neutralization is very exothermic and care must be exercised to keep the reaction temperature low. Enough water is added to make the solids of the entire product 30% by weight. Enough base is added to keep the pH at 7.0–7.5. Cooling is used as required to keep the reaction is at or below 30° C.

| Example | Bimodal Alkoxylate Example | Base Type |
|---|---|---|
| 51 | 26 | NaOH |
| 52 | 27 | NaOH |
| 53 | 28 | KOH |
| 54 | 29 | KOH |
| 55 | 30 | Ca(OH)$_2$ |
| 56 | 31 | KOH |
| 57 | 32 | Ca(OH)$_2$ |
| 58 | 33 | NaOH |
| 59 | 34 | NH$_4$OH |
| 60 | 35 | Mg(OH)$_2$ |
| 61 | 36 | N—(CH$_2$CH$_2$OH)$_3$ |
| 62 | 37 | Mg(OH)$_2$ |
| 63 | 38 | Mg(OH)$_2$ |
| 64 | 39 | NaOH |
| 65 | 40 | Ca(OH)$_2$ |
| 66 | 41 | Ca(OH)$_2$ |
| 67 | 42 | KOH |
| 68 | 43 | NH$_4$OH |
| 69 | 44 | NaOH |
| 70 | 45 | KOH |
| 71 | 46 | NH$_4$OH |
| 72 | 47 | KOH |
| 73 | 48 | NaOH |
| 74 | 49 | NaOH |
| 75 | 50 | KOH |

Application Examples

The sulfation of the bimodal alkoxylated products result in even more unexpected results in that the efficiency of the emulsifiers is increased many times. By efficiency of emulsification is meant the ability of one gram of emulsifier to emulsify a given amount of oil. Typically, the oil-to-emulsifier ratio has been that for every one part of emulsifier, one can emulsify about 20 parts of oil. So, for example, 3 grams of traditional emulsifier may emulsify 60 grams of oil. The products of the present invention will generally emulsify 100 times their weight in oil, making very efficient packages for emulsification.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

We claim:

1. A sulfated bi-modal composition, which comprises:
   (a) between 10% and 50% by weight of an emulsifier which conforms to the following structure:

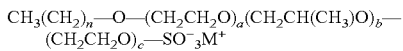

wherein;
   n is an integer ranging from 5 to 19;
   a, b, and c are independently each integers ranging from 0 to 20;
   M is a group needed as a counter ion and selected from the group consisting of Na, K, Ca, Mg, $NH_4$ and $HN-(CH_2CH_2OH)_3$
   and
   (b) between 90% and 50% of an emulsifier which conforms to the following structure:

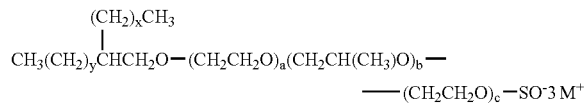

wherein;
   y is an integer ranging from 5 to 19, and is equal to n;
   x is an integer ranging from 3 to 17 with the proviso that x=y+2
   M is a group needed as a counter ion and selected from the group consisting of Na, K, Ca, Mg, $NH_4$ and $HN-(CH_2CH_2OH)_3$
   a, b, and c are independently each integers ranging from 0 to 20.

2. A sulfated bimodal composition of claim 1 wherein n is 5, x is 3 and y is 5.

3. A sulfated bimodal composition of claim 1 wherein n is 9, x is 7 and y is 9.

4. A sulfated bimodal composition of claim 1 wherein n is 7, x is 5 and y is 7.

5. A sulfated bimodal composition of claim 1 wherein n is 11, x is 9 and y is 11.

6. A sulfated bimodal composition of claim 1 wherein n is 19, x is 17 and y is 19.

7. A sulfated bimodal composition of claim 1 wherein M is Na.

8. A sulfated bimodal composition of claim 1 wherein M is K.

9. A sulfated bimodal composition of claim 1 wherein M is $NH_4$.

10. A sulfated bimodal composition of claim 1 wherein M is Ca.

11. A sulfated bimodal composition of claim 1 wherein M is Mg.

12. A process for making an emulsion, which comprises mixing;
    (1) between 1% and 50% by weight of a water insoluble oil,
    (2) between 98% and 35% water
    and
    (3) between 1% and 15% by weight of sulfated bi-modal emulsifier compositions, which comprises:
    (b) between 10% and 50% by weight of an emulsifier which conforms to the following structure:

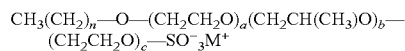

wherein;
    n is an integer ranging from 5 to 19;
    a, b, and c are independently each integers ranging from 0 to 20;
    M is a group needed as a counter ion and selected from the group consisting of Na, K, Ca, Mg, $NH_4$ and $HN-(CH_2CH_2OH)_3$
    and
    (b) between 90% and 50% of an emulsifier which conforms to the following structure:

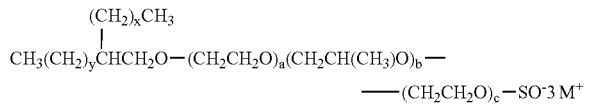

wherein;
    y is an integer ranging from 5 to 19, and is equal to n;
    x is an integer ranging from 3 to 17 with the proviso that x=y+2;
    M is a group needed as a counter ion and selected from the group consisting of Na, K, Ca, Mg, $NH_4$ and $HN-(CH_2CH_2OH)_3$
    a, b, and c are independently each integers ranging from 0 to 20.

13. A process of claim 12 wherein n is 5, x is 3 and y is 5.

14. A process of claim 12 wherein n is 9, x is 7 and y is 9.

15. A process of claim 12 wherein n is 7, x is 5 and y is 7.

16. A process of claim 12 wherein n is 11, x is 9 and y is 11.

17. A process of claim 12 wherein n is 19, x is 17 and y is 19.

18. A process of claim 12 wherein M is Ca.

19. A process of claim 12 wherein M is Mg.

* * * * *